Patented Sept. 16, 1924.

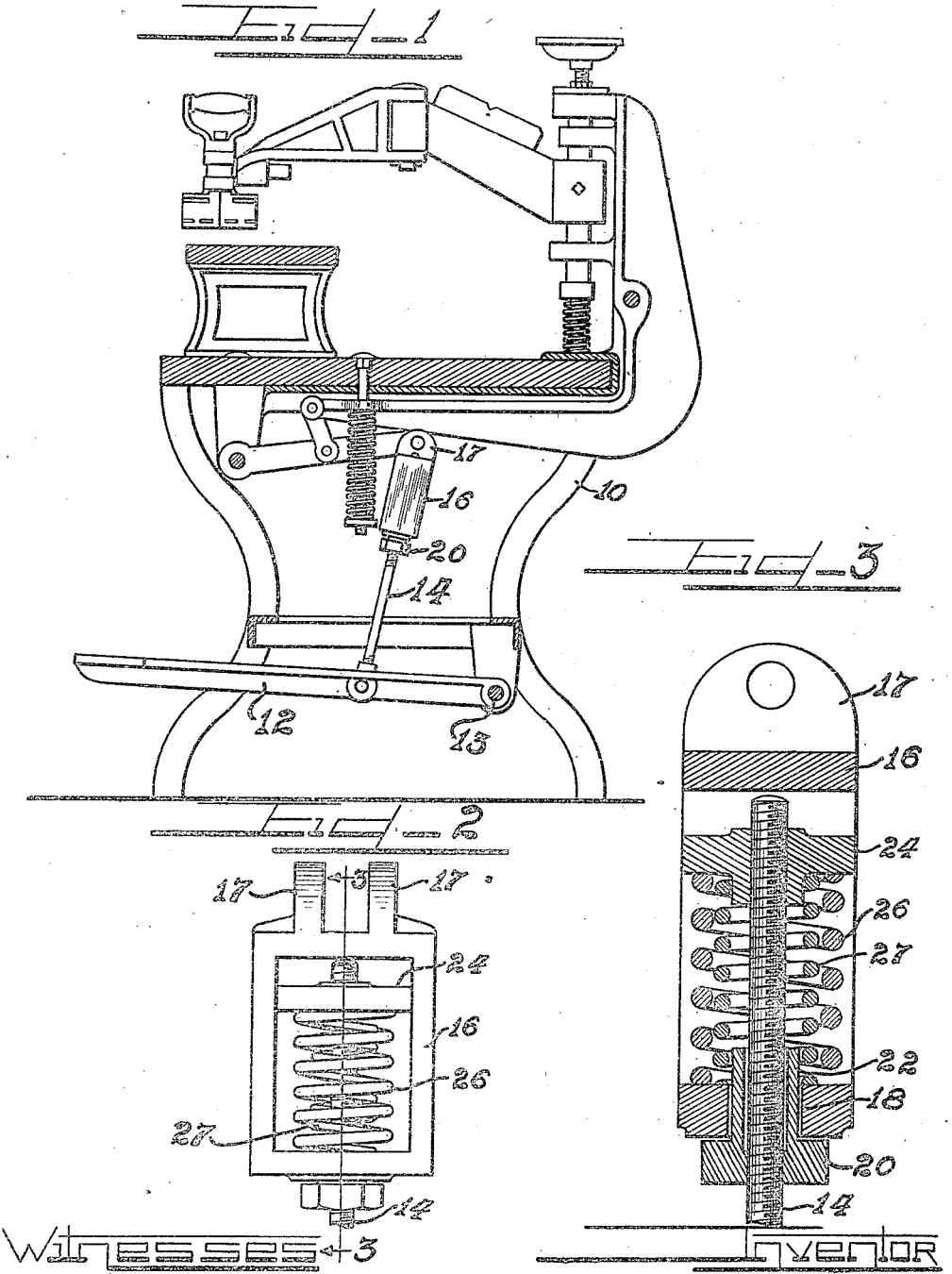

1,508,781

UNITED STATES PATENT OFFICE.

HERMAN EHRLICH, OF CHICAGO, ILLINOIS.

YIELDABLE PITMAN FOR JUMPER PRESSES.

Application filed March 15, 1923. Serial No. 625,242.

*To all whom it may concern:*

Be it known that I, HERMAN EHRLICH, a citizen of the United States, and a resident of the city of Chicago, in the county of Cook and State of Illinois, have invented certain new and useful Improvements in Yieldable Pitmen for Jumper Presses; and I do hereby declare that the following is a full, clear, and exact description of the same, reference being had to the accompanying drawings and to the numerals of reference marked thereon, which form a part of this specification.

This invention relates to presses of the sort which are used in pressing clothes, but it is equally applicable to other presses operated by foot power and having a motion which comes to a definite stopping place.

It is an object of this invention to devise a connection between the press and the treadle mechanism which shall relieve the operator of the shock incident to an abrupt stoppage of the motion of the press.

It is a further object of this invention to provide a cushioning means between the treadle and the press whereby the operator may throw his whole weight upon the treadle without danger of injury by a shock when the press arrives at its limit of motion.

It is a further object of this invention to provide adjustments whereby the device may be used for operating a press by a heavy or a light operator.

It is a further object of this invention to provide a device of the class indicated which shall not be subject to wear through the operation of the press.

Other and further important objects of this invention will be apparent from the disclosures in the specification and the accompanying drawings.

The invention (in a preferred form) is illustrated in the drawings and hereinafter more fully described.

On the drawings:

Figure 1 is a side view, partly in section, of a press showing the application of my invention thereto.

Figure 2 is a side view of a detail illustrating my invention.

Figure 3 is an enlarged section upon the line 3—3 of Figure 2.

As shown on the drawings:

The press has the usual frame 10 in which is mounted a treadle 12 pivotally connected to the frame at 13, to which a link 14 is pivotally connected. The upper part of the link 14 is screw-threaded and enters a cage or frame 16, the upper end of which is equipped with two ears 17 by which the frame 16 is pivotally connected to the lever system of the press, so that the rod 14 and the frame 16 together form a link connecting the treadle 12 to the lever work of the press.

The lower member of the frame 16 has an opening 18 through which the threaded part of the rod 14 goes. The nut 20 is threaded on the rod 14 below the opening 18. This nut is provided with a sleeve 22 which surrounds the threads of the screw-threaded part of the rod 14 and protects them from contact with the wall of the hole 18. The rod 14 extends up into the interior of the frame 16 and near its upper end is supplied with a nut 24 which is in the form of a rectangular plate with a boss in the center thereof having a screw-threaded hole for receiving the threaded end of the rod 14. The sides of the rectangular plate 24 contact the inner faces of the side members of the frame 16 so that the plate 24 is not free to rotate.

Between the plate 24 and the bottom member of the frame 16 is mounted a spring 26. As shown, this spring is in the form of a helix of comparatively heavy stock. If desired, it may be supplemented by a spring 27 of lighter stock, preferably within the spring 26. It will, however, be obvious that one spring heavy enough to do the work required may be used or that more than two springs may be used if desired, or that, if desired, all of the springs may be made of stock of the same weight.

In assembling the device, the nut 20 with its sleeve 22 is first screwed onto the threaded part of the rod 14. The springs 26 and 27 and the plate 24 are then placed inside of the frame 16 and the rod 14 is passed through the opening 18 until the sleeve 22 is inside of this opening. The rod 14 is then rotated, the nut 20 rotating with it, until the end of the rod has entered the threaded hole in the center of the plate 24 to the required distance. The nut 20 travels with the rod 14 so that when the rod reaches its final position the sleeve 22 will be inside of the hole 18 and the upper surface of the nut 20 will be in contact with the bottom of the frame 16. The ears 17 are then pinned to the proper place in the lever work of the press, and the lower end of the rod 14 is pinned to the treadle 12.

The nut 20 can be adjusted along the rod 14 by turning the nut in the frame 16. The rod 14 can be adjusted relative to the plate 24 by unpinning the rod from the treadle and rotating it. The frame 16 keeps the plate 24 from rotating. This action is as properly called an adjustment of the plate 24 relative to the rod 14. By adjusting the plate 24 and the nut 20 along the rod 14 in the same direction, the position of the treadle may be regulated up and down. By adjusting these two along the rod in opposite directions, the tension of the springs can be changed.

If the springs have been set to a strong compression to accommodate a heavy workman and a light workman takes his place, the light workman will find that the springs act too like a solid connection so that he gets but little relief from shock. On the other hand, if the springs are set to a slight tension to accommodate a light workman, a heavy workman on taking his place will find the length of stroke of the treadle uncomfortably long. He will therefore adjust the parts to give the springs the necessary tension.

In the operation of the device, after the correct adjustment has been obtained, when the operator desires to actuate the press, he steps or jumps upon the treadle 12. This causes the treadle to move downward which draws the link 14 downward, which causes the plate 24 to descend. The plate 24 exerts a thrust on the springs 26 and 27 which causes the frame 16 to descend and so works the lever mechanism of the press. When the press reaches its limit of motion, a sudden resistance to the movement of the lever-work results, but this does not cause a sudden stoppage of the treadle 12. Instead, the treadle 12 continues to move downward, moving the link 14 downward and moving the plate 24 relative to the frame 16, so compressing the springs 26 and 27. The downward motion of the treadle 12 will be gradually arrested by the springs, the treadle coming to rest when the force exerted by the springs counterbalances the force exerted by the weight of the operator or by his weight plus the rate of change of his momentum as he stamps or jumps upon the treadle 12. When the operator releases this treadle 12 the springs 26 and 27 again extend, lifting the plate 24 and so raising the treadle 12. This upward motion continues until the nut 20 strikes against the bottom of the frame 16. Movement of the press away from its limiting position will then raise frame 16 and rod 14 as a unit.

When there is a change in operators and the new operator is not as heavy as the old, the adjustment must be made for lessening the tension in the springs 26 and 27 as above explained; otherwise these springs may present too rigid a structure and the lighter operator will meet with a shock at the end of the downward movement of the treadle 12.

During the motion of the rod 14 relative to the frame 16 the threads of the rod do not rub against the sides of the hole 18 because the sleeve 22 protects them from such rubbing. The sleeve 22 not being a threaded surface can rub against the sides of the hole 18 without harm.

I am aware that numerous details of construction may be varied through a wide range without departing from the principles of this invention, and I therefore do not purpose limiting the patent granted otherwise than necessitated by the prior art.

I claim as my invention:

1. In a device of the class described, a frame having an opening in one member thereof, a rod extending through said opening, a stop adjustably secured to said rod, a sleeve rigid with said stop and surrounding said rod at the point where it passes through said opening, and spring means for resiliently bringing the stop against said member of the frame.

2. In a device of the class described, a screw-threaded rod, a frame having an opening in one of its end members, a nut on said rod, a sleeve connected with said nut and surrounding said rod, said sleeve lying between said rod and the walls of said opening, whereby motion of the rod relative to the frame will cause no wear upon the threads on the rod.

In testimony whereof I have hereunto subscribed my name in the presence of two subscribing witnesses.

HERMAN EHRLICH.

Witnesses:
 CARLTON HILL,
 OSCAR HARTMANN.